United States Patent Office 2,773,140
Patented Dec. 4, 1956

2,773,140

CIRCUIT CONTROL APPARATUS FOR CONDENSER-DISCHARGE IGNITION SYSTEMS

Glen A. Guernsey and John C. Garen, West Springfield, and Arthur H. Green, East Longmeadow, Mass., assignors, by mesne assignments, to Globe-Union Inc., a corporation of Delaware Application February 23, 1954, Serial No. 411,903

4 Claims. (Cl. 200—24)

This invention relates to an improved circuit-control apparatus for condenser-discharge ignition systems.

The general object of the invention is to provide in one housing, which may be readily mounted on an internal combustion engine, all the apparatus that is necessary to control all the electrical circuits of an engine-ignition system of the condenser-discharge type, such apparatus including breakers for controlling the charging of the condenser, a combined timer and distributor for timing the discharges of the condenser and distributing them to the spark plugs in proper sequence, means for varying the timing of the discharges of the condenser with variations in speed of, and load on the engine, together with means for varying the time of closing of the charging circuit of the condenser.

A particular object of the invention is to provide in a distributor an improved mounting of the rotor thereof for automatic adjustment of the active face of its contact toward the plane that includes the active faces of the series of spark-plug contacts, which last-named faces are successively confronted by the first-named face during rotation of the rotor, whereby to compensate for wear of the contacts, caused either by burning or rubbing, and to maintain the first-named face with close accuracy in parallelism with the second-named faces.

The invention has for another object the provision in a distributor, of a rotor and a disk mounted coaxially of the rotor for angular adjustment relatively thereto, said disk carrying on one face all of the spark-plug contacts and on the other face a series of short conducting tracks, one for and electrically connected to each contact, timing means for adjusting the angular position of said disk, and a series of terminals one for each contact and adapted for connection to the spark plugs of the engine, each terminal including a plunger spring-pressed into engagement with the adjacent track.

Another object of the invention is to provide in a distributor of the type just described, timing means for varying the angular position of the contact-bearing disk and other timing means for varying the angular position of the rotor, one such means adapted to respond to engine speed and the other adapted to respond to vacuum produced in the intake manifold of the engine.

The invention has for a further object the provision of a pair of circuit breakers and means for actuating them alternately, so that when one set of breaker points separate the points of the other set will be engaged, and a single condenser serving alternately with the two sets of breaker points when the points of such set separate.

These and other objects will more particularly appear from the detailed description of one illustrative embodiment of the invention in the accompanying drawings, in which, Fig. 1 is a sectional elevational view of a circuit control apparatus embodying the invention;

Fig. 10 is a fragmentary sectional elevational view showing the driving connections between the drive shaft, centrifugal-advance timing means, breaker cam and rotor of the combined timer and distributor.

Figure 1:
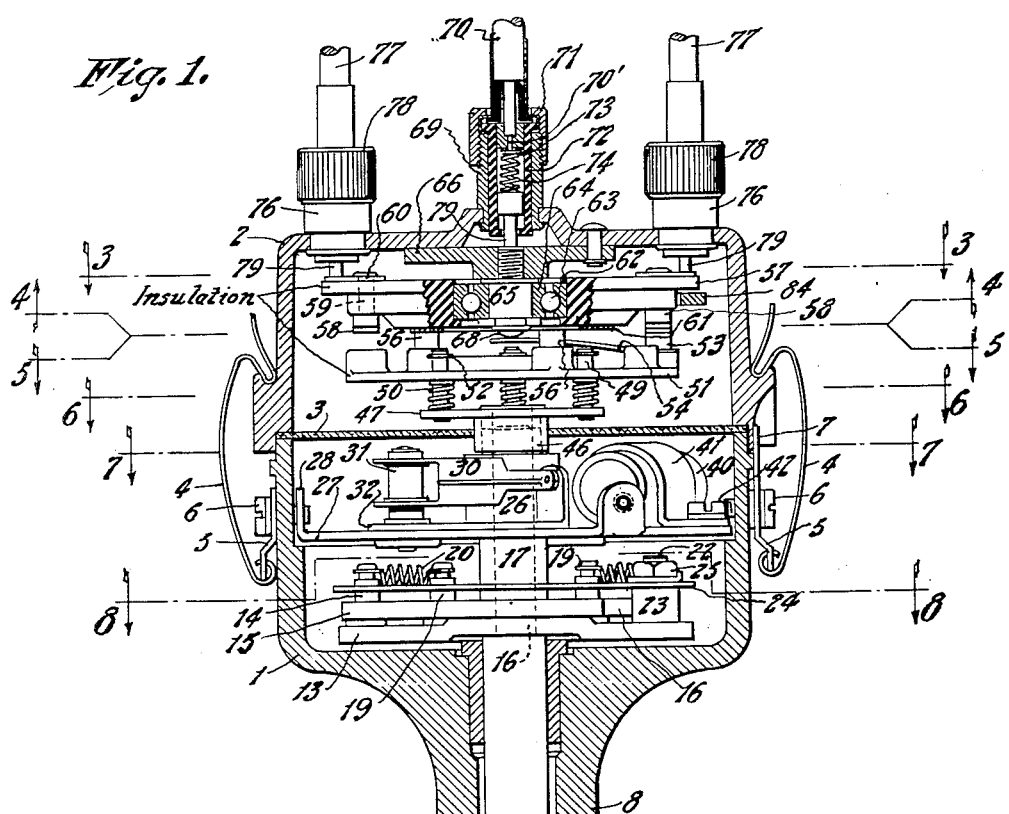
Figure 2:
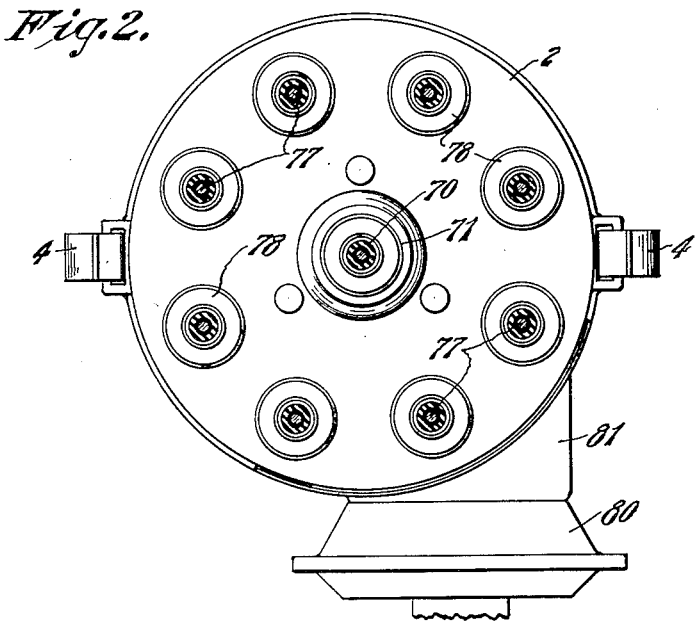
Fig. 2 is a top plan view thereof.

Referring to these drawings and first to Fig. 1 thereof; the ignition apparatus, which is intended primarily for a condenser-discharge ignition system, is contained within a housing comprising a lower cup-shaped metallic casing 1 and a metallic cap 2 of inverted cup-shape. The open ends of this casing and cap interfit, as shown, and abut the marginal portion of a circular disk 3 of cork-like material serving both as a gasket and a dust cover. The parts 1 and 2 are held together by two spring clips 4, which are pivoted to lugs 5, secured to casing 1 by means of screws 6 and the upper ends of which engage shoulders on cap 2. One of these clips has an upward extension 7 which fits like a key in a recess in cap 2 and maintains the latter in proper angular position on the lower casing 1. The latter has a long hub 8 depending from its bottom, terminating with a flange 9, and, below the latter, is a tubular extension or quill 10 which is adapted to fit in a socket in the crankcase of an internal combustion engine. This hub and quill contain bearings for the driving shaft 11, the lower end of which has fixed thereto a suitable coupling element 12, adapted for driving engagement with a mating coupling element driven by a shaft of the engine.

Figure 8:
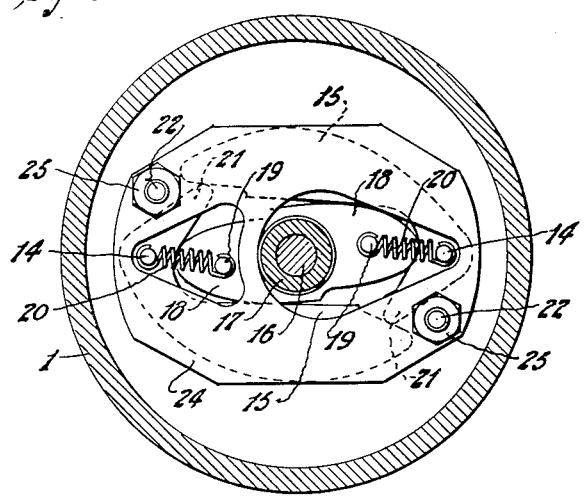
Fig. 8 is a sectional plan view taken on the line 8—8 of Fig. 1.
Figure 9:
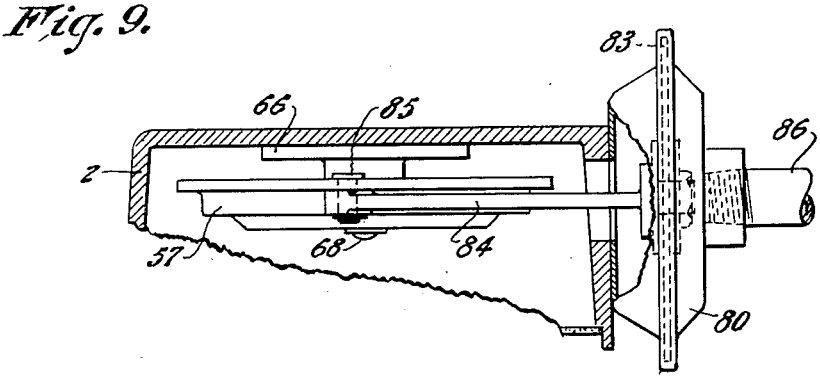
Fig. 9 is a fragmentary cross sectional view taken on the line 9—9 of Fig. 4.

Within the lower part of the casing 1 is a suitable speed-responsive mechanism, which may be of any suitable type. The particular mechanism, shown herein by way of illustrative example, is substantially like that disclosed in the Arthur Patent No. 2,079,145, dated May 4, 1937 and is shown in Figs. 1 and 8. It includes a base plate 13 centrally fixed to shaft 11 and having fixed to it at diametrically-opposed locations two upstanding pivot posts 14, each serving as a fulcrum for a weight 15. The shaft 11 has an upper portion 16 of reduced diameter to rotatably receive a long hub 17, from the lower end of which two arms 18 extend radially outward in opposite directions and carry, one on each, upstanding pivot posts 19. A spring 20 connects each post 19 to the adjacent post 14 and tends to pull its weight 15 inwardly until a finger-like extension 21 of the weight bears on the periphery of the adjacent arm 18. The base plate 13 also has fixed to it two upstanding studs 22, carrying, one on each, a spacer sleeve 23 on which is supported a plate 24, which is clamped to the upper ends of the sleeves by nuts 25. This plate is adapted to hold down the weights. The weights 15, when moved outwardly by centrifugal force, turn the arms 18 by means of the fingers 21 and thus turn hub 17 ahead in the direction of revolution of shaft 11 (counterclockwise as shown in Fig. 8).

Figure 7:
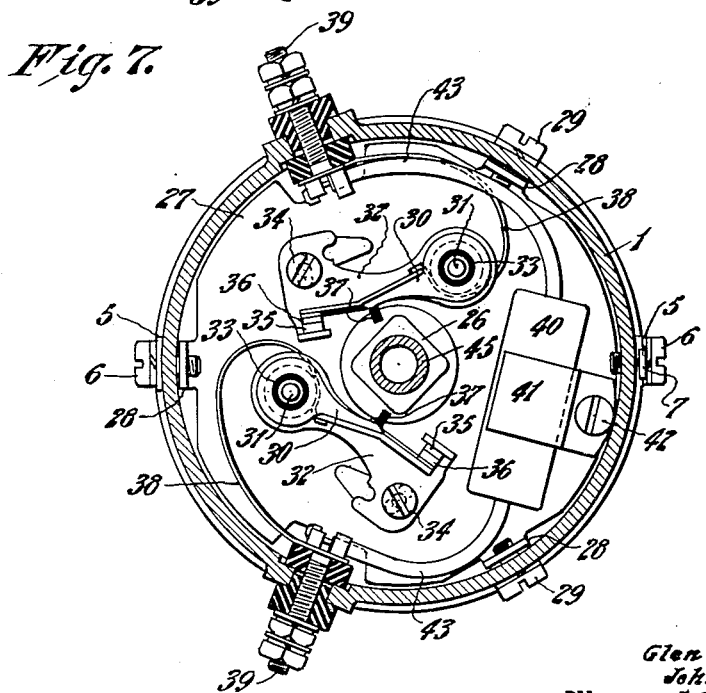
Fig. 7 is a sectional plan view taken on the line 7—7 of Fig. 1.

Immediately above the speed-responsive mechanism described is located the breaker mechanism shown in Figs. 1 and 7. This mechanism includes two breakers which are actuated by a cam 26 fixed on the upper end of the sleeve 17 of such mechanism. These breakers control the charging of the main condenser of the system. The breakers are supported by a base plate 27, having three angularly spaced upstanding lugs 28, one of which is secured to housing 1 by the described screw 6 and the other two of which are secured to the housing by screws 29. Each breaker consists of a metallic arm 30 which is pivoted on a stud 31, fixed to and upstanding from a sub-base plate 32 and which is insulated from the stud by a sleeve 33. This stud also extends through base plate 27. The sub-base plate 32 is clamped to base plate 27 by a screw 34, which passes through a curved slot in the sub-base plate and threads into the base plate 27. This sub-base plate may be turned about the axis of stud 31 to bodily move the breaker into various positions of adjustment relatively to the cam 26 that actuates it. Each sub-base plate 32 has an upturned lug that carries a breaker point 35 to cooperate with a breaker point 36 on the adjacent breaker arm. Each breaker arm 30 has a cam follower 37 of insulating material for engagement by cam 26. Each breaker arm is moved to engage its point 36 with the mating point 35 by means of a flat spring 38, which is fixed at one end to the arm and at the other end to a terminal bolt 39. The latter is fixed in and insulated from the housing 1 as indicated. Each spring 38 also serves as an electrical conductor.

The two pairs of breaker points (Fig. 7) are so located that cam 26 will open them alternately. A single condenser, which is contained within a cylindrical casing 40 held to base plate 27 by means of a clamp 41 and a screw 42, serves for both pairs of breaker points. The two terminals of this condenser are connected by wires 43 one to each of the described terminal posts 39. When one pair of breaker points open, the other pair will be closed and the closed pair of points will serve to connect one of the wires 43 to the ground. Thus, assuming that the lower pair of breaker points open, the lower breaker point on the lower breaker arm is connected through such arm, its spring 38 and one wire 43 to one terminal of the condenser while the other lower breaker point will be connected through its sub-base plate 32, the base plate 27, the other sub-base plate 32, the upper and engaged pair of breaker points 35 and 36, upper arm 30, its spring 38 and the other wire 43. Subsequently, when the upper pair of breaker points separate, the lower pair will be engaged. The fixed upper breaker point will then be connected through its sub-base plate 32, base plate 27, lower sub-base plate 32, the engaged lower pair of points, the lower breaker arm, its spring 38 and a wire 43 to one terminal of the condenser, the other terminal of the latter being connected to the point on the upper breaker arm by the other wire 43 and upper spring 38. Thus, a single condenser may serve two sets of breaker points by being bridged first across one pair of open points and then across the other set of open points.

Figure 5:
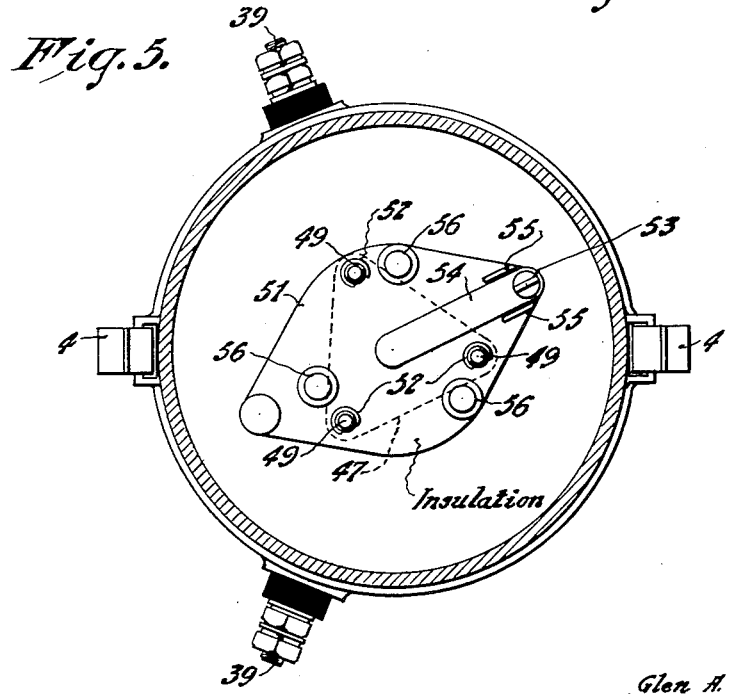
Fig. 5 is a sectional plan view taken on the line 5—5 of Fig. 1.
Figure 6:
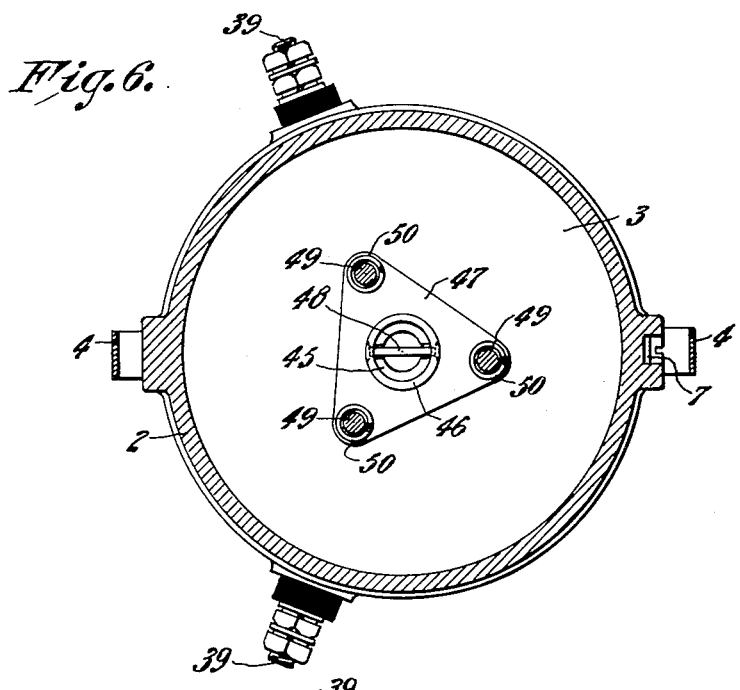
Fig. 6 is a sectional plan view taken on the line 6—6 of Fig. 1.

Above the breakers and condenser (Fig. 1) and housed within the cap 2 above the dust cover 3 is the distributor which also functions as a timer. The brush element of the latter is driven by and synchronously with cam 26. The latter (see Fig. 10) has a short cylindrical coaxial upward extension 45 with a diametrical slot therein. This extension receives and closely fits in the hollow hub 46 of a driving member which includes a face plate 47, having substantially the shape of an equilateral triangle (Fig. 6). A pin 48 fixed at its ends in this hub 46 and spanning diametrically across it, fits into the aforesaid diametrical slot and keys the hub to extension 45. Fixed at one end to the triangular plate 47 and projecting upwardly from the top face thereof are three cylindrical studs 49 which are located one at each corner of the plate and accurately at right angles to the upper face of plate 47 and parallel to the axis of revolution of such plate. The plate 47 is fixed accurately at right angles to hub 46 which has a close fit with hub 45. The plate 47 cannot wobble and is located with close accuracy at right angles to its axis of rotation. Each stud 49 has a coil spring 50 which encompasses it and one end of which rests on the upper face of the face plate 47. The several studs 49 pass through an overlying carrier plate 51 (see also Fig. 5) which is made of suitable insulating material, such as Bakelite for example, and carries the distributor brush or contact. This plate 51 rests on top of the several springs 50. Snap rings 52, one on each stud 49 near the upper end thereof, limit the upward movement of plate 51 by springs 50, as for example when cap 2 is removed. The carrier plate 51 has fixed thereto near one end thereof and upstanding therefrom the distributor-brush tungsten contact 53, the upper and active face of which has the shape of a narrow rectangle. The long side of this rectangle is disposed parallel to a radius extending from the rotational axis of the plate 51 centrally between the long sides of the rectangle. Fixed to the brush contact 53 is a flat metal spring 54 which extends radially inwardly to the center of plate 51 for connection to the main condenser of the system, as will later appear. This spring fits between two upstanding parallel projections 55 which prevent the spring from turning. The plate 51 also carries three upstanding cylindrical brushes 56, which may for example be of graphite and are suitably fixed in the plate. The outer end faces of the several brushes 56 and the outer end face of contact 53 are accurately finished, as for example by grinding, so as to lie with close accuracy in parallelism and preferably in one horizontal plane, which is at right angles to the axis of revolution of plate 51.

Figure 3:
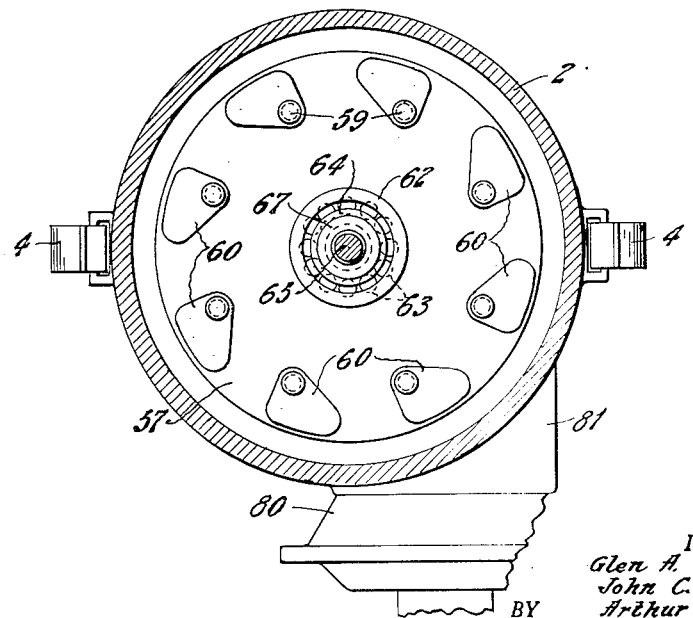
Fig. 3 is a sectional plan view taken on the line 3—3 of Fig. 1.
Figure 4:
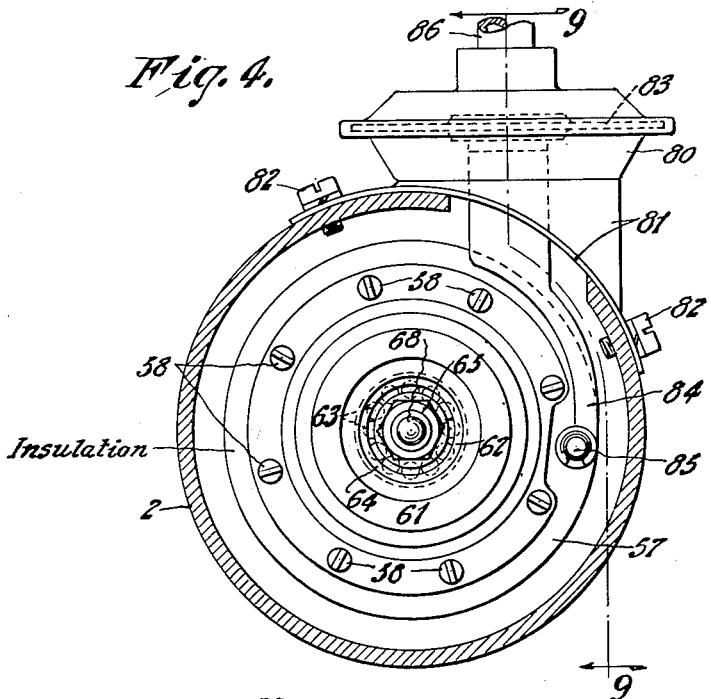
Fig. 4 is a sectional plan view taken on the line 4—4 of Fig. 1.

Mounted in cap 2 above the described carrier plate 51 is a circular disk 57 of suitable insulating material, such for example as Bakelite. The plate (Fig. 5) carries a plurality (eight as shown) of contacts 58, there being one such contact for each spark plug and the contacts being equally spaced in a circular series having its center in the axis of revolution of plate 51. These spark plug contacts as shown in Fig. 1 project downwardly from the bottom face of the disk 57 and their outer end faces are accurately finished to lie in one horizontal plane at right angles to said axis. These contacts are constructed like the contact 53, with narrow, rectangular outer end faces which are adapted to be successively confronted and preferably engaged by the outer end face of the brush contact as the carrier plate 51 rotates. Each spark plug contact 58 has a part 59 that passes upwardly through disk 57 and is fixed to a contact 60, which is constructed like a short track (Fig. 3). Located within the circular series of contacts 58 (Fig. 4) is a circular track 61 which may, for example, be made of brass and which is fixed to the bottom face of disk 57, coaxially of the brushes 56, the outer end faces of which ride on the track. The springs 50 are adapted to press the carrier plate 51 upwardly and force the upper end faces of the brushes 56 against the track 61 and by so doing, the upper end face of the brush or contact 53 is located with precision in the same horizontal plane which includes the lower end faces of all the contacts 58 or alternatively if actual engagement between the relatively rotatable contacts is not desired, in a different but parallel plane.

The disk 57 is supported for a limited amount of angular adjustment about its vertical axis for timing purposes. As shown in Fig. 1, the disk 57 has centrally fixed thereto the outer race 62 of a ball bearing, the balls of which are designated as 63 and the inner race as 64. The inner race 64 is supported by a stud 65, the upper end of which is screw threaded into a crowfoot 66, riveted to the upper wall of cap 2. A washer is interposed between the lower face of the hub of the crowfoot 66 and the upper end face of the inner race 64. The lower end face of inner race 64 engages the head of stud 65. Thus, the disk 57 is supported so that it may easily be turned about its axis and yet supported so that the lower end faces of all the contacts 58 are maintained with close accuracy in a plane at true right angles to the axis of revolution of plate 51. Inset into the lower end of stud 65 is a brush 68, which may for example, be of graphite and which is engaged by the inner end of the described flat spring 54 that is affixed to the rotatable brush or contact 53.

Fixed centrally to the top wall of the distributor cap 2 in coaxial relation with stud 65 is a socket 69 adapted to receive a terminal fitting on the end of a shielded cable, such as 70, which serves to conduct the discharge of a condenser (not shown) to the distributor brush 68. This terminal fitting, which is clamped in its socket by the nut 71, includes a sleeve 72 of insulation within which is a plunger 73 urged downwardly by a spring 74 into contact with the upper end of stud 65. This spring connects the plunger to a washer 75 to which the wire 70' of the cable is connected.

Surrounding the central socket is a circular series of eight equally-spaced sockets 76, which receive terminal fittings on the ends of the shielded spark plug cables 77, such fittings being clamped in their sockets by nuts 78. Each of these fittings is identical in construction with the above-described fitting on the cable 70 and includes a spring-pressed plunger 79 which presses against an underlying contact or short track 60. Each of these contacts is greater in angular extent than the plunger 79 that engages it, whereby to enable the disk 57 to be moved to a sufficient extent for spark-timing purposes and yet maintain electrical connection with its plunger 79.

This disk 57 is adapted to be moved for timing purposes by suction derived from the intake manifold of the internal combustion engine, with which the ignition apparatus of this invention is adapted to be used. A metal casing 80 (Fig. 4), having a flange 71 secured to cap 2 by screws 82, contains a diaphragm 83. Secured to one side of the latter is a rod 84, the outer end of which is pivotally received on a stud 85, fixed to and upstanding from disk 57. The casing 80 on the other side of diaphragm 83 is adapted to be connected to the intake manifold of the engine by a pipe 86. The disk 57, when moved by suction, is turned counterclockwise as viewed in Fig. 4 or clockwise as viewed in Fig. 3, turning in a direction opposite to that in which the distributor contact 53 is moved by the speed-responsive mechanism. Both the vacuum and the speed responsive mechanisms thus advance the time when their respective contacts engage.

The particular illustrative embodiment of the invention herein shown is intended for use with an eight-cylinder four-cycle internal combustion engine. The apparatus is mounted on the engine and its shaft 11 is driven at cam shaft speed. This shaft drives the breaker cam 26 and the distributor rotor through the timing means, shown in Fig. 8, which functions in response to increase in engine speed above a predetermined minimum to advance the breaker cam and with it the distributor rotor. The cam 26 actuates the breakers alternately causing first one pair of breaker points 35, 36 to separate and then the other pair. Hence, during one rotation of the four lobe cam 26, eight closings and openings of the breaker points are obtained. Each pair of points, when engaged, closes a charging circuit to a condenser and the division of the work between two breakers enables the charging interval to be twice that which would be possible with a single breaker actuated by an eight-lobe cam. The distributor brush carries its contact 53 successively into confronting relation with the circular series of spark-plug contacts 58 and times the discharge of the condenser as well as distributing the discharges to the spark plugs of the engine in proper sequence. As the load on the engine varies, variations in the degree of vacuum in the intake manifold are produced and these act on the diaphragm 83, causing it to shift the disk 57 and thus vary the angular position of all the spark plug contacts 58 with relation to the distributor, and thereby varying the timing of the discharges of the condenser.

An important feature of the invention consists in the mounting of the distributor brush so that the active or outer end face of its contact 53 is maintained with precision in true parallelism with the active outer end face of the spark plug contacts 58 which it successively confronts as it rotates. This is especially necessary, where as is preferred and as herein illustrated, the moving contact is to physically engage each of the spark plug contacts. The outer end face of the rotating contact must wipe over the outer end face of each spark-plug contact and the surfaces engage by just touching without any impingement elsewhere of the rotating contact on any of the relatively fixed contacts. The brush carrier 51 is slidable on the three studs 49 in the direction of its axis of rotation but it is held against movement in all other directions. Also, the plate 47, which carries the studs 49, is connected to the cam 26 that drives it, in such a manner that it rotates in true coaxial relation with its driving element, maintaining the axes of the several studs 49 in true parallelism with the axis of rotation of such element. The brush carrier, while movable axially by the springs 50, cannot wobble and it cannot be displaced by centrifugal force so as to interfere with the desired accuracy of movement of the contact 53. These springs press the brush carrier upwardly, forcing the upper end faces of the three brushes 56 against the guide track 61. This three-point engagement of brushes and track enables the carrier to be maintained parallel with the guiding track and insures the desired close accuracy of location of the active end face of the distributor contact 53 in true parallelism with, and preferably in the same plane as, the active end faces of the several spark plug contacts 58.

The same arrangement may be utilized, in cases where actual engagement between the moving contact and the spark plug contacts is not necessary. The active end face of the moving contact may thereby be maintained in true parallelism with the active end faces of the spark-plug contacts to insure a uniform gap between the active end face of the contact and the active face of each spark-plug contact that it confronts in operation.

Another feature of the invention is the arrangement whereby one condenser is made to serve alternately two pairs of breaker points. The breaker cam 26 so controls the two pairs of breaker points that when either pair separate, the other pair are engaged and this enables one terminal of the condenser to be connected through the engaged pair of breaker points to the grounded support plates 32, 27 and 32 to the fixed breaker point of the pair that are separating.

The invention provides in one completely shielded housing all the circuit controlling means necessary for an engine-ignition system of the condenser discharge type.

What is claimed is:

1. In a distributor, a rotatable driving member having a face normal to its axis of revolution and three studs each fixed at one end to said member and projecting from said face parallel to said axis, said studs being angularly-spaced in a circular series about said axis, a coil spring encompassing each stud with one end engaged with said face, a brush carrier consisting of a plate slidably engaged with all said studs and having one face engaged with the other ends of all said springs, three brushes each fixed at one end to said carrier plate and projecting from and normal to the other face thereof, said brushes being angularly-spaced in a circular series about said axis and having their outer end faces located in a common plane, a disk supported coaxially of said carrier plate and driving member with one face adjacent to the second-named face of the carrier plate, a plurality of spark plug contacts fixed to said disk and projecting from said face with their outer end faces located in a common plane parallel to the first-named plane, said contacts being equally-spaced in circular series about the axis of said disk, a distributor brush contact fixed at one end to the carrier plate and projecting from its second-named face, the outer end face of said brush contact being parallel to the first-named plane and adapted to successively move into confronting relation with the end faces of the spark plug contacts, and a circular track fixed to said face of said disk and having its outer face parrallel with the second-named plane, said track being engaged by the end faces of said brushes to position the outer end face of the distributor brush contact parallel with the plane in which the outer end faces of the spark plug contacts are located.

2. The combination as claimed in claim 1, in which the disk is mounted for limited angular movement about its axis, a circular series of angularly-spaced short tracks fixed to the other face of the disk and electrically connected one to each contact of the circular series, a circular series of terminals one for each short track and each including a plunger spring-pressed into engagement with a short track, each short track having an angular extent greater than that of the plunger which engages it, whereby to maintain electrical connection between each terminal and an adjacent track and connected contact throughout a limited angular range of movement of said plate, and timing means for moving said disk about its axis throughout said range.

3. The combination, as claimed in claim 2, in which a stud stationarily supported coaxially of the carrier plate supports the disk for angular adjustment, a contact mounted in said stud coaxially thereof, a leaf spring fixed at one end to said carrier plate and electrically connected to the distributor contact and engaged at its other end by the last-named contact.

4. In a distributor, a rotatable driving member having a face normal to its axis of revolution and three studs each fixed at one end to said member and projecting from said face parallel to said axis, said studs being angularly-spaced in a circular series about said axis, a coil spring encompassing each stud with one end engaged with said face, a brush carrier consisting of a plate slidably engaged with all said studs and having one face engaged with the other ends of all said springs, three brushes each fixed at one end to said carrier plate and projecting from and normal to the other face thereof, said brushes being angularly-spaced in a circular series about said axis and having their outer end faces located in a common plane, a disk supported coaxially of said carrier plate and driving member with one face adjacent to the second-named face of the carrier plate, a plurality of spark plug contacts fixed to said disk and projecting from said face with their outer end faces located in a common plane parallel to the first-named plane, said contacts being equally-spaced in circular series about the axis of said disk, a distributor brush contact fixed at one end to the carrier plate and projecting from its second-named face, the distributor brush contact having its outer end face located in a plane parallel with the first-named plane and adapted during its rotation to successively engage the end faces of the spark plug contacts, and a circular track fixed to said face of said disk and having its outer face parallel with said second-named plane and engaged by the outer end faces of said brushes to position the outer end face of the brush contact in the second-named plane for successive engagement with the outer end faces of the spark plug contacts.

References Cited in the file of this patent

UNITED STATES PATENTS

| | | |
|---|---|---|
| 1,733,942 | Chryst | Oct. 29, 1929 |
| 1,801,600 | Fitzsimmons | Apr. 21, 1931 |
| 1,807,624 | Hittle | June 2, 1931 |
| 1,905,054 | Prescott et al. | Apr. 25, 1933 |
| 2,070,072 | Varela | Feb. 9, 1937 |
| 2,087,339 | Arthur | July 20, 1937 |
| 2,205,074 | Van Damme | June 18, 1940 |
| 2,399,165 | Carson | Apr. 30, 1946 |
| 2,552,609 | White | May 15, 1951 |